Jan. 20, 1970  R. L. GOWER  3,490,112
CLOSURE MEANS FOR HOOK THROATS AND LIKE
OPEN-END CONNECTING DEVICES
Filed June 5, 1967

INVENTOR.
ROGER L. GOWER
BY
ATTORNEY.

United States Patent Office 3,490,112
Patented Jan. 20, 1970

3,490,112
CLOSURE MEANS FOR HOOK THROATS AND LIKE OPEN-END CONNECTING DEVICES
Roger L. Gower, P.O. Box 65,
Canaan, Maine 04924
Filed June 5, 1967, Ser. No. 643,431
Int. Cl. B66c *1/36;* F16b *45/04*
U.S. Cl. 24—238                                                2 Claims

ABSTRACT OF THE DISCLOSURE

The present invention relates to removable means for closing the throats of hooks and like connecting devices having open ends, by the provision of a pin or the like inserted through the outermost end of the hook or other similar device and extending part-way across the throat of the opening.

---

The present invention comprises, in combination, a hook or the like of any convenient type, and near the end thereof, an opening for accommodating a pin which is driven through said opening to extend across the throat of the hook or similar device, thus preventing the escape of a chain link or a loop of cable into which the hook as been inserted.

It is the purpose to provide a pin longitudinally ridged or of the conventional type which, being rolled, resists compression and thus may not be accidentially dislodged.

Figure 1:
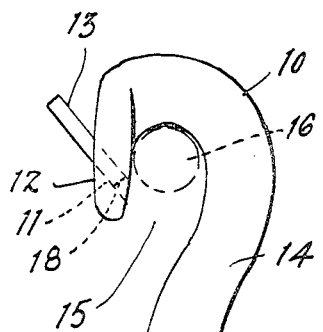
Figure 2:
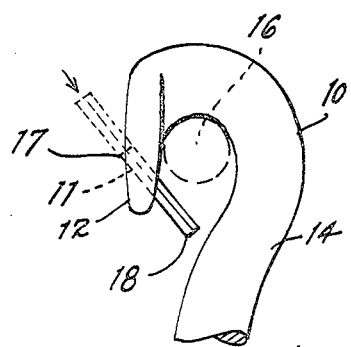
Figure 3:
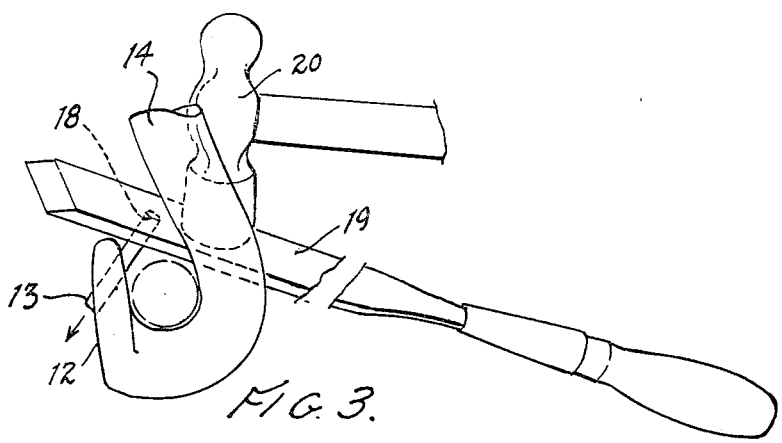

In the accompanying drawings forming a part of this application, in which like numerals are employed to designate like parts throughout the same, FIGURE 1 is a side elevation of a conventional slip hook, having the closure means of the present invention partially inserted;

FIGURE 2 is a view as in FIGURE 1 but with the closure means fully driven into closed position; and FIGURE 3 is a side elevation of a hook showing the method by which the pin constituting the closure means is removed.

Referring to the drawings and more particularly to FIGURE 1 thereof, the hook 10 is shown with a cylindrical opening 11 formed through the end 12, and pin 13 partially inserted into said opening toward shank 14, to effect a partial closing of throat 15, thus containing a link as of chain or a loop as of cable 16, within the throat as closely by said pin 13.

In FIGURE 2 the pin 13 is shown fully inserted so that its head 17 is even with the surface of the hook and its leading end 18 closes the throat 15 so as to prevent the escape of the said link of chain or loop of cable 16.

FIGURE 3 shows the method by which said pin 13 may be removed when it is desired to release the member which has been held in the closed throat of the hook. A tool 19, such as, for example, a chisel, is inserted between the leading end 18 of the pin 13 and the shank 14, and a slight blow with a hammer 20 causes the pin to be backed out through the opening 11 in the hook.

Figure 4:
Figure 5:
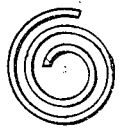

FIGURE 4 shows in cross-section one of the types of longitudinally ridged pins commercially available; and FIGURE 5 shows a cross-sectional view of a commercially available rolled pin.

While the form of the invention as shown and described herein may be taken as a preferred example of the same, it is to be understood that modifications may be made.

What I claim as my invention and desire to secure by Letters Patent of the United States, is:

1. An open end connecting device of generally J-shape hook configuration providing a throat for reception of a chain link and having means for closing said throat to prevent inadvertent release of a chain link therefrom, said means comprising an opening extending through the free end of the hook toward the shank of the hook and a pin removably secured witin the opening and having sufficient longitudinal length to extend a sufficient distance across said throat to retain the link therein, said pin being adapted to be manually removed from said hook opening by insertion of a wedging tool such as a chisel between the leading end thereof and the shank of the hook and applying a hammer blow to the chisel to back the pin out of the opening, said pin having means for preventing accidental dislodgement of the pin from the opening during normal use of the hook, said dislodgment preventing means being provided by the pin beaing rolled in such a manner as to resist compression.

2. An open end connecting device of generally J-shape hook configuration providing a throat for reception of a chain link and having means for closing said throat to prevent inadvertent release of a chain link therefrom, said means comprising an opening extending through the free end of the hook toward the shank of the hook and a pin removably secured within the opening and having sufficient longitudinal length to extend a sufficient distance across said throat to retain the link therein, said pin being adapted to be manually removed from said hook opening by insertion of a wedging tool such as a chisel between the leading end thereof and the shank of the hook and applying a hammer blow to the chisel to back the pin out of the opening, said pin having means for preventing accidental dislodgement of the pin from the opening during normal use of the hook, said dislodgement preventing means being provided by longitudinal ridges extending throughout the length of the pin and said pin having a maximum diameter formed by the apexes of said ridges slightly greater than the diameter of the said opening in the free end of the hook, thereby causing said pin to resist compression when inserted through said opening.

References Cited

UNITED STATES PATENTS

| | | |
|---|---|---|
| 635,136 | 10/1899 | Irving. |
| 1,989,018 | 1/1935 | Norwood _____ 85—5 |
| 2,737,843 | 3/1956 | Koehl _____ 85—5 |
| 1,475,046 | 11/1923 | Bolei. |
| 1,793,419 | 2/1931 | Seger. |
| 2,333,925 | 11/1943 | Grossett _____ 24—238 |
| 2,392,368 | 1/1946 | Dilbert. |

FOREIGN PATENTS

| | | |
|---|---|---|
| 380,449 | 9/1964 | Switzerland. |
| 100,257 | 1898 | Germany. |
| 262,529 | 7/1913 | Germany. |

DONALD A. GRIFFIN, Primary Examiner